United States Patent
Wester et al.

(10) Patent No.: US 8,856,092 B2
(45) Date of Patent: *Oct. 7, 2014

(54) SYSTEMS AND METHODS FOR MANAGING DATABASES

(75) Inventors: Joachim Wester, Vaxholm (SE); Erik Ohlsson, Asarp (SE); Per Samuelsson, Stockholm (SE); Peter Idestam-Almquist, Gustavsberg (SE)

(73) Assignee: Starcounter AB, Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 13/546,121

(22) Filed: Jul. 11, 2012

(65) Prior Publication Data

US 2012/0278278 A1 Nov. 1, 2012

Related U.S. Application Data

(63) Continuation of application No. 12/571,521, filed on Oct. 1, 2009, now Pat. No. 8,266,125.

(51) Int. Cl.
- *G06F 7/00* (2006.01)
- *G06F 17/00* (2006.01)
- *G06F 17/30* (2006.01)

(52) U.S. Cl.
CPC .... *G06F 17/30607* (2013.01); *G06F 17/30377* (2013.01)
USPC ............ 707/703; 707/736; 707/758; 711/108

(58) Field of Classification Search
None
See application file for complete search history.

(56) References Cited

U.S. PATENT DOCUMENTS

| | | |
|---|---|---|
| 5,295,256 A | 3/1994 | Bapat |
| 5,873,093 A | 2/1999 | Williamson et al. |

(Continued)

FOREIGN PATENT DOCUMENTS

| | | |
|---|---|---|
| EP | 0459683 | 12/1991 |
| WO | WO 95/03586 | 2/1995 |

(Continued)

OTHER PUBLICATIONS

Millard, B. et al., Run-Time Support and Storage Management for Memory-Mapped Persistent Objects, Proceedings of the International Conference on Distributed Computing Systems, Pittsburgh, May 25-28, 1993, Los Alamitos, IEEE Comp. Soc. Press, US, vol. 13, pp. 508-515, 1993.

(Continued)

*Primary Examiner* — Fred I Ehichioya
*Assistant Examiner* — Jau-Shya Meng
(74) *Attorney, Agent, or Firm* — Kilpatrick Townsend & Stockton LLP

(57) ABSTRACT

Systems and methods for managing databases are disclosed. One system includes a processor-addressable physical memory and a processor in communication with the processor-addressable physical memory and configured to execute an environment and to allocate an environment memory to the environment. In such a system, the environment is configured to maintain a database of objects in a database memory within the environment memory. An application executes in an application memory within the environment memory, and upon instantiation of a database object, the application environment allocates memory in the database for the database object, the database providing master storage for the database object. Upon an instruction to obtain the database object from said application, the environment provides to the application a reference to the database object; and upon an access operation on the database object by the application, provides to the application direct access to data of said database object.

21 Claims, 6 Drawing Sheets

(56) References Cited

U.S. PATENT DOCUMENTS

| | | |
|---|---|---|
| 5,937,409 A | 8/1999 | Wetherbee |
| 6,047,284 A | 4/2000 | Owens et al. |
| 6,253,226 B1 * | 6/2001 | Chidambaran et al. ....... 718/104 |
| 6,314,417 B1 * | 11/2001 | Bennett et al. ................ 707/703 |
| 7,143,087 B2 * | 11/2006 | Fairweather .................. 707/770 |
| 7,210,013 B2 * | 4/2007 | Itoh et al. ...................... 711/163 |
| 8,161,006 B2 * | 4/2012 | Kawamura .................... 707/640 |
| 8,266,125 B2 | 9/2012 | Wester et al. |
| 2005/0187980 A1 | 8/2005 | Carlin et al. |
| 2006/0095332 A1 | 5/2006 | Riemann et al. |
| 2006/0248198 A1 * | 11/2006 | Galchev ........................ 709/227 |
| 2009/0157628 A1 * | 6/2009 | Arthursson et al. ............. 707/3 |

FOREIGN PATENT DOCUMENTS

| | | |
|---|---|---|
| WO | WO 99/17232 | 4/1999 |
| WO | WO 02/37335 | 5/2002 |

OTHER PUBLICATIONS

International Search Report and Written Opinion, International Application No. PCT/EP2009/062784, mailed Dec. 2, 2009.

* cited by examiner

SYSTEMS AND METHODS FOR MANAGING DATABASES

RELATED APPLICATIONS

This application is a continuation of U.S. patent application Ser. No. 12/571,521, filed Oct. 1, 2009, entitled "Systems and Methods for Managing Databases," the entirety of which is hereby incorporated by reference.

FIELD OF THE INVENTION

The present invention generally relates to database management systems (DBMSs), and more particularly relates to runtime execution of database applications written in object oriented computer languages.

BACKGROUND

A common need of software applications is a persistent database in which data can be stored. For example, a supplier of auto parts may need to store and manage information about parts, customers, orders, and other entities. In addition, the data may need to be accessible by multiple users and applications simultaneously. The data also need to be administered so that specific information can easily and efficiently be found amongst large amounts of data, and the data should not be lost if power to the computer system is turned off. To address these needs, DBMSs are used to store and provide access to data. A DBMS can typically receive data from one or more users and/or software applications, store said data for extended periods of time and provide that data to the same or other software applications and/or users. DBMSs also typically store the data on computer-readable media that do not lose their contents if they lose power.

Another common need of software applications is an object oriented computer language runtime in which applications can be executed. An example of a computer language runtime is a virtual machine such as for example a Java Virtual Machine or the Microsoft .NET Common Language Runtime. Another example of a computer language runtime is compiler created machine code processed by one or more processors at runtime together with runtime libraries, as may be the case with, for example, C++ applications.

A common goal of DBMSs is to provide high performance in terms of transaction throughput and transaction latency to minimize hardware cost, wait time and increase the number of transactions per unit of time. Even with large investments in hardware, achieving the desired performance is often expensive and sometimes may not possible. Another common goal of DBMSs is to reduce complexity with respect to the application development process and thus save time and money and reduce the risk of errors. Development of database application is a complex, time consuming, error-prone and costly process.

SUMMARY

Embodiments of the present invention comprise systems, methods, and computer-readable media for managing databases. For example, one embodiment of the present invention is a system comprising a processor-addressable, physical memory and a processor in communication with the processor-addressable physical memory and configured to execute an application environment and to allocate an environment memory to said application environment, said environment memory corresponding to a physical memory. In such an embodiment, the application environment is configured to maintain a database configured to store one or more objects in a database memory within said environment memory, execute a first application in a first application memory within said environment memory, upon instantiation of a database object by said first application, allocate memory in said database for said database object, the database providing master storage for said database object; upon an instruction to obtain said database object by code of said first application, provide to said first application a reference to said database object, and upon an access operation on an instance attribute of said database object by said first application, provide to said first application direct access to data of said database object at a processor-addressable physical memory address in said database memory.

These illustrative embodiments are mentioned not to limit or define the invention, but to provide examples to aid understanding thereof. Illustrative embodiments are discussed in the Detailed Description, and further description of the invention is provided there. Advantages offered by various embodiments of this invention may be further understood by examining this specification.

BRIEF DESCRIPTION OF THE DRAWINGS

These and other features, aspects, and advantages of the present invention are better understood when the following Detailed Description is read with reference to the accompanying drawings, wherein.

DETAILED DESCRIPTION

Embodiments of the present invention provide systems and methods for managing databases. The following disclosed embodiments are intended to provide illustrative examples of embodiments of systems and methods for managing databases. It is not intended to be exhaustive, and other embodiments are within the scope of this disclosure. The following paragraphs provide some general discussion intended to introduce terminology used throughout this disclosure. It is intended to provide context for some disclosed embodiments, but is not intended to limit the scope of this disclosure in any way.

Illustrative Management of Databases

Figure 1:
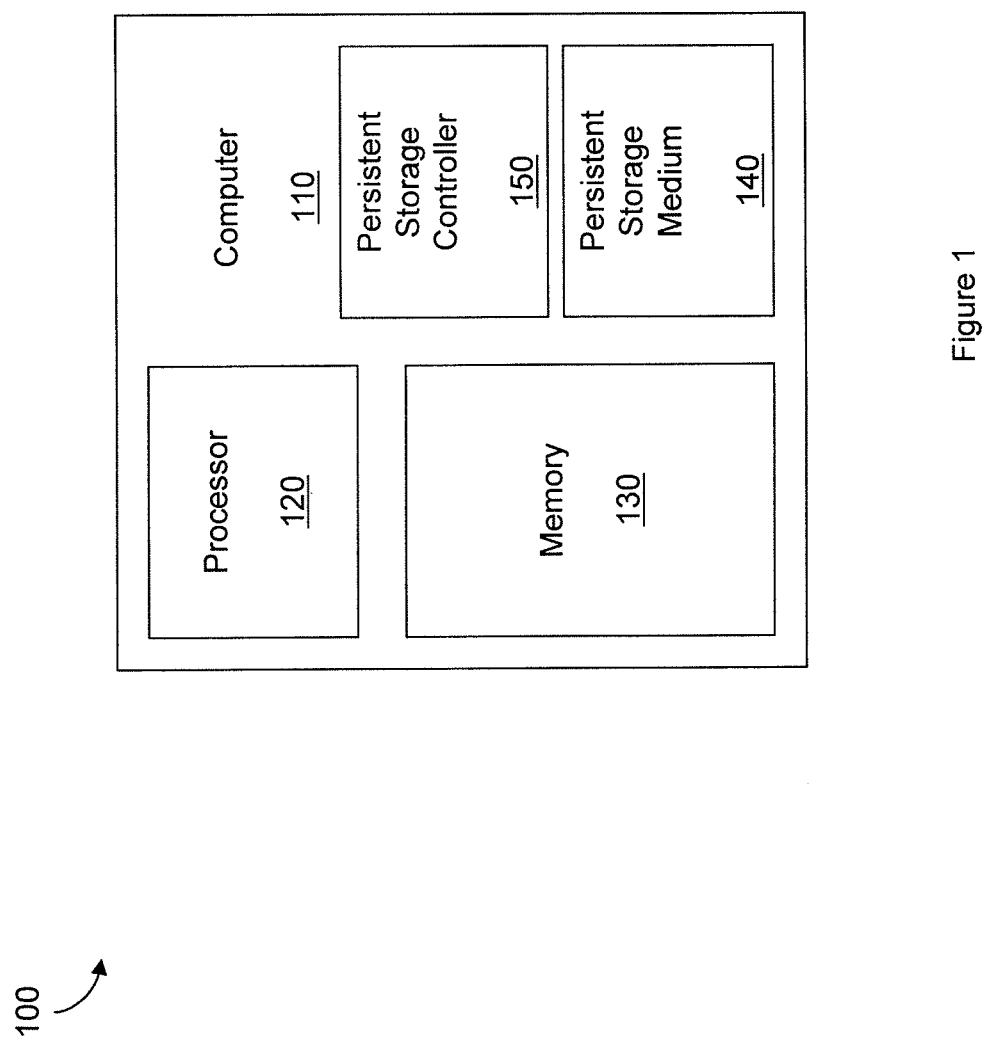
FIG. 1 shows a system for managing databases according to one embodiment of the present invention.

Referring to FIG. 1, FIG. 1 shows a system 100 for managing databases according to one embodiment. The system 100 comprises a processor 120, a processor-addressable memory comprising physical memory media 130, a non-processor-addressable persistent storage 140 and a persistent storage controller 150. In some embodiments, the processor-addressable memory 130 may comprise a persistent storage medium. In such embodiments, a non-processor-addressable persistent storage 140 may not be needed. The processor is in communication with the processor-addressable memory 130 such that the processor 120 can access said memory directly using the machine language memory addressing of the processor. In the embodiment shown in FIG. 1, the processor 120 is configured via the operating system (not shown) to allocate portions of the processor-addressable memory 130 to an application environment and to execute an application environment in the allocated physical memory 130. The persistent storage controller 150 is in communication with the persistent storage 140. The persistent storage controller is typically a separate hard drive controller. In the embodiment shown in FIG. 1, the persistent storage controller 150 is in communication with the processor-addressable memory 130 such that the persistent storage controller 150 is capable of direct memory access (DMA). The processor-addressable memory 130 may occupy the same physical medium as the persistent storage 140 as for example may be the case for solid state memory such as for example flash memory and other non volatile memory.

In conventional computer systems, hardware components are used to provide processing capabilities and data storage to software applications. Typically, a computer will include one or more processors (CPUs) for executing applications comprising computer code. Each CPU may include one or more processor cores. The CPUs will be connected to memory that is processor-addressable, i.e. memory that can be addressed by the machine language of the CPU.

An example of such addressing using machine language is using a machine code "load" operation that loads the processor addressable memory to a register of the CPU. In some instances different kinds of processors can share the same memory. In some configurations, processor addressable memory may span several memory media such as for example RAM together with disk. In such cases, the processor in cooperation with operating software may translate some addresses to map to various physical parts of a computer-readable media. However, the combination of media directly addressable by such machine language addressing constitutes processor addressable memory. Typically, processor-addressable memory comprises dynamic random access memory (DRAM) in varying quantities. It is not uncommon to find conventional desktop computers with 4 gigabytes (4 GB) of DRAM. And high-performance servers can have far greater quantities of DRAM. However, the concept of processor-addressable memory in this specification is not intended to be limited to DRAM-type memory, but rather it is a broader term that refers to memory that is directly, physically addressable and accessible by a CPU. In many cases, such memory is referred to as "system memory" or "main memory" to distinguish it from other types of memory in a computer that are not processor-addressable. Such memories may include memory built into some graphics adaptors, which may only be accessed indirectly by a CPU and thus not addressable directly.

Another type of non-processor-addressable memory described in this specification is memory in a long-term storage medium (where the memory is not part of a virtual memory). Long term storage media are typically not processor-addressable memories. For example, typically the major part of a hard drive is a memory, but it is not directly addressable by a CPU. A CPU may request data from anywhere on a hard drive, but the actual memory accesses are handled by a hard drive controller processor and then copied into processor addressable memory such as the main memory (primary memory) or the registers of the CPU. The CPU does not have direct access to the memory locations on the hard drive by its addressing space. This is true for other storage media such as optical drives, flash drives, and many other non-volatile storage devices. And while a processor may have the capability to directly access memory locations on the hard drive, it is not the processor that executes applications on the computer. Rather, it is a processor in a disk controller. Thus, the distinction drawn herein is whether the CPU has direct access to a particular memory rather than the type of memory that is accessed. For example, while DRAM is currently the de facto standard for processor-addressable memory, it is conceivable that DRAM, which is volatile and loses any data held within it if it loses power, may be replaced by non-volatile memories that are directly addressable by a CPU. Thus, processor-addressable memory encompasses memories within a computer system that are directly addressable and accessible by the processor or processors that execute operating systems and application software, rather than processors within subsystems of the computer, such as disk controllers and graphics adapters.

In addition to the distinction between processor-addressable and non-processor-addressable memories, distinction is made herein between master storage (or data) and non-master storage (or data). In computer science, a cache is a collection of data duplicating original values stored elsewhere or computed earlier. The original values are the sources of information sometime referred to as the master data. Also in computer science, memory coherency using various consistency models allows for multiple memory storage media to provide master storage to host said original data or master.

Each memory used to store the specific piece of data can be categorized as either being master storage or non-master storage. To have multiple master storages, each master storage needs to be updated synchronously or atomically to other master storages. As opposed to non-master storage, the physical memory media of the master storage represents the up-to-date value. The master storage can thus be read directly from its physical media without needing to copy data from, or lock data in, some other data source. Examples of when memory is master storage are the storage of a main database image, disk caches of such images and synchronous database caches. Examples of non-master storage are local objects on the heap of the computer language, backups and caching business objects on the heap of the computer language runtime of the application.

The type of consistency model used is not material to some embodiments of the present invention. For example, a consistency model using a single source (i.e. there is only one master storage and each piece of data is located on a single physical media address). Various synchronization schemes using locking can provide memory on different physical medium to each constitute master storage as is illustrated in the example.

Figure 6:
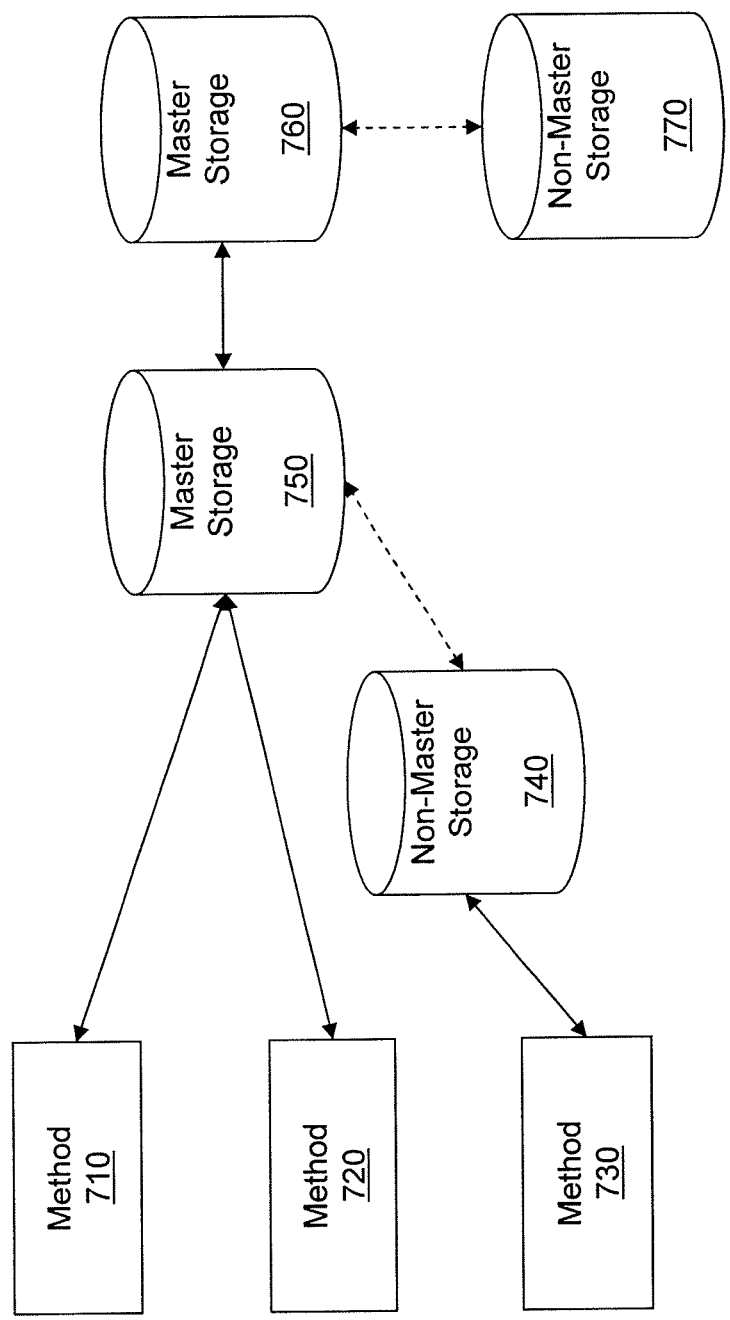
FIG. 6 shows an illustrative system comprising a plurality of master storage and non-master storage locations.

Referring now to FIG. 6, FIG. 6 shows an illustrative system comprising a plurality of master storage and non-master storage locations. In the system shown in FIG. 6, a plurality of methods 710-730 are configured to access data stored in a storage medium. For example, method 710 is configured to access master storage medium 750 without using an intermediary storage device, such as a cache or mirror. In contrast, method 730 is configured to access non-master storage 740, which must be asynchronously synchronized with master storage medium 750. In the system shown in FIG. 6, non-master storage 740 comprises a database cache. In such a case, an access by method 730 of data stored in non-master storage 740 may cause non-master storage to 740 to access master storage 750 if the data stored in the non-master storage 740 is no longer accurate. In addition to master storage 750, the system also comprises a second master storage 760 which may be accessed independently of master storage 750 without needing to refer to data stored in master storage 750. And similar to non-master storage 740, non-master storage 770 must asynchronously synchronize with master storage 760 to ensure data consistency. Thus, as is illustrated in FIG. 6, it is possible to have multiple master storage media and non-master storage media in a system. However, master storage is distinguished from non-master storage by the characteristic that it does not need to verify the correctness of its content against another storage medium.

Figure 2:
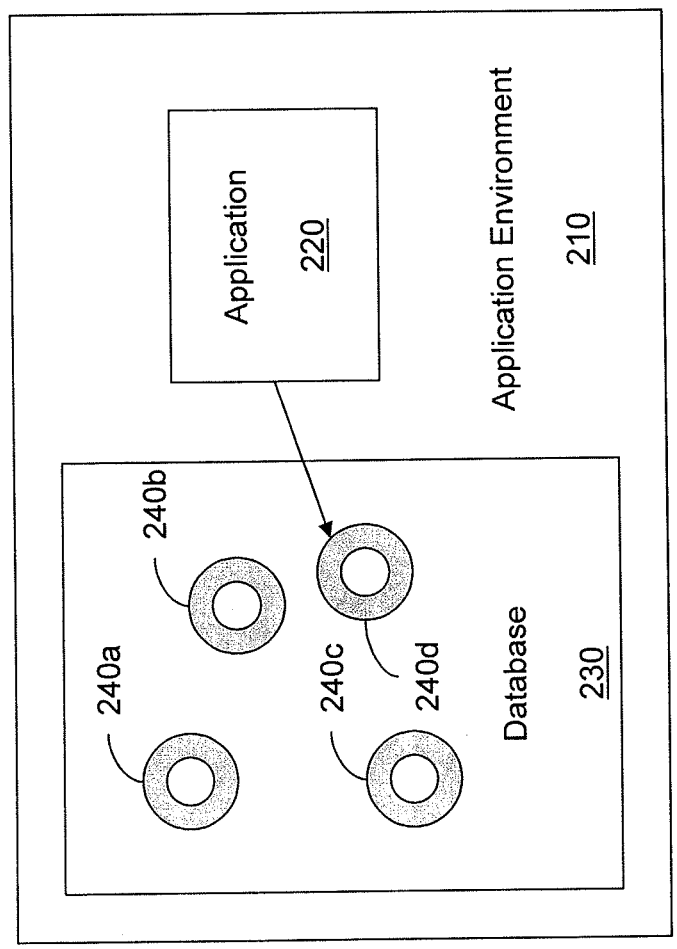
FIG. 2 shows a diagram of an application environment according to one embodiment of the present invention.

Referring now to FIG. 2, FIG. 2 shows an application environment 210 according to one embodiment of the present invention. FIG. 2 will be described with respect to the system 100 shown in FIG. 1. The processor 120 shown in FIG. 1 is configured to execute the application environment 210 shown in FIG. 2. The application environment 210 shown in FIG. 2 executes within a portion of the processor-addressable physical memory 130 allocated to the application environment 210 by the processor 120. The application environment 210 is configured to allocate memory to one or more applications executed within the application environment 210.

The application environment 210 supports functionality that is typically provided by a full-featured DBMS, such as a relational DBMS or an object DBMS. For example, in one embodiment, the application environment 210 is configured to receive queries for database objects in the database 230, execute those queries on the database 230, and provide a response comprising a result set that satisfy the query, and fetch one or more objects In the embodiment shown in FIGS. 1 and 2, the processor 120 executes the application environment 210 and allocates a portion of the processor-addressable physical memory 130 to the application environment 210. The application environment 210 allocates a portion of its memory to the database 230. The application environment 210 also allocates a portion of its memory to an application 220 and then causes the processor to execute the application 220. Applications may then instantiate database objects or non-database objects, or access database objects stored in the database.

While the processor 220 is executing the application's computer code, the application instantiates a new "Customer" object 240*d*. In the embodiment shown, the application 220 is written using the C# computer language and instantiates the new customer object using the C# "new" operator. For example, the application 220 includes the statement Customer a=new Customer( );

In a conventional C# program, such a statement would instantiate a new object and cause additional local memory to be allocated to the application to store the object. For instance, a class file stored on the persistent storage medium 140 (e.g., a disk drive) may be copied into allocated local memory. However, in the embodiment shown in FIGS. 1 and 2, the application environment 210 allocates memory for the new "Customer" object 240*d* within the database memory. The application environment 210 then provides the address location of the object in the database memory to the application such that the application can directly access and modify the object. For example, to change the age of the customer represented by the new object 240*d*, the application can directly access an instance attribute, such as by using the following statement:

a.Age=35;

The object attribute data comprises data containing the instance data of an object. For a class named "Person" that declares the attributes "Name" and "Age", the name "Jack" and the age "35" of an object of the "Person" class comprises the attribute data of that object. The statement changes the value of the object's instance attribute that holds the customer's age. Notably, the application 220 directly accesses the object 240*d* in the database 230.

The application can also directly access member functions of an object, such as by using native programming language class operators. For example, an application could directly call a class function of an object as follows:

a.UpdatePurchaseHistory(order);

Regular Classes and Database Classes

In object oriented programming, developers may create classes using an object oriented computer language. For example, a regular class may be declared as follows in C# or Java:

class MyClass { string myString;}

Classes can be instantiated as objects (class instances). A typical way to create a class instance is to use the "new" operator, such as in the C# or Java language. In the following example using C# or Java, the variable "a" is assigned to a class instance regularly instantiated from a regular class:

MyClass a=new MyClass( );

or

MyOtherClass a=new MyOtherClass("Hello" );

The new object resulting from such regular class instantiation is stored in dynamically allocated memory that is allocated from processor addressable memory into a computer language runtime heap. An application's heap is maintained in an application memory associated with a specific application execution. Each such application memory is separate such that it only contains objects local to a single application execution. For example, if multiple executions of the same application are executing, each execution will have a heap associated with it that cannot be accessed by any of the other executions. When the application execution terminates, the application memory is freed and its contents are discarded so that the memory can be reused. (The heap may or may not be based on a heap data structure. In computer science, the term heap sometimes refers to a general purpose tree based data structure but in this document, the term heap shall mean such dynamic memory pertaining to an application execution). The heap is used in conventional language runtimes to host dynamic application data configured to persist for duration of the application execution, and be lost when the application execution terminates. In C++, memory on the heap is typically allocated and de-allocated by the "new" and "delete" operators. In Java and C#, a regular class instance is typically removed by an automated garbage collector. A heap is local and non persistent because it is associated with a single application execution or because its lifespan is otherwise limited and not because of the type of memory medium it uses. A heap may be local and have a limited lifespan although it uses a physical medium that is capable of persistent storage (for instance maintaining its state after loss of electrical power).

Memory allocated to an application or other program is referred to herein as "local." Non-local memory is referred to herein as "external" memory. Attempts by an application to access external memory result in errors or faults and may halt execution of the application. Alternatively, in a virtual machine, such as a virtual machine executing Java or C#, the virtual machine may not allow the application to even attempt to access external memory by requiring the author of the application to write managed code that does not directly expose memory pointers to the code of the application.

For a regular class, the regular class instantiation described above will result in a class instance that has been allocated on the application execution's heap, thus have its attribute data stored in the application memory assigned to the current application execution. A database object, on the other hand, may either be instantiated by a special instantiation method (such as for example "newdb" or "new(dbheap)" instead of "new" or a special member function, constructor or some other special method) or it is instantiated by a class that is declared as being a database class or a class that has been declared to be hosted in a special database heap. Such declaration can be defined in the source code of the class or in separate configuration files.

Also the application environment may declare that a whole application, a whole library or a whole namespace contain database classes or objects. In one embodiment of the present invention, all instantiations of class instances generate database objects. In some other embodiments, the application environment can differentiate between regular and database classes, and/or can differentiate between regular class instantiations and instantiations that generate database objects. In some embodiments, a database object is an object that has been configured by the application execution to be instantiated as a part of the database memory, and consequently, persisted onto a persistent storage medium. In some embodiments, the application environment determines that an object is a database object without the application execution declaring the object to be a database object.

For example, in some embodiments, a database object is a class instance that has been instantiated from a class that has been defined as a database class or that has been instantiated by a method that indicates the object is to be instantiated in a database memory. For example, in one embodiment, a database class is a class that has been declared as persistent in the class definition.

```
[Persistent] // Instances of MyClass are database objects
class MyClass
{ ... }
```

In one embodiment, a database class can be a class that inherits or extends a database base class.

```
class MyClass extends PersistentObject
// Instances of MyClass are database objects
{ ... }
```

In another embodiment, a database class can be declared like a regular class but then configured using configuration files or other configuration media to be a database class.

```
<Configuration>
    <Persistent Class="MyClass">
</Configuration>
```

Another example of a database object is an object that has been instantiated from a class using a method or operator that indicates that it is a persistent class.

```
MyClass a = newdb MyClass( );
// "a" is a database object
or
MyClass a = new(db1) MyClass( );
// "a" is a database object
or
Myclass a = db1.New( MyClass.Class );
// "a" is a database object
```

After a class has been instantiated in a database memory, it may later be retrieved as a result of a database query. For example, the following command may retrieve a reference to the desired object in database memory.

```
a = Sql.GetFirst("SELECT x FROM MyClass x WHERE ID=123");
// where "a" is a database object
```

The above examples are not intended to limit the invention, but only to give illustrative examples of declaring and instantiating database objects. Still further embodiments are contemplated by the scope of the invention. For example, in one embodiment, an application environment may assume that objects are database objects by default and that non-database objects are explicitly declared or instructed.

As discussed above, an application environment according to one embodiment of the present invention may allow database objects to be allocated and updated directly in a database memory area. However, conventional databases require that database updates be done through an intermediate layer, such as a DBMS. In such databases, a function must be called within the DBMS to instruct the DBMS to update a value in the database. The DBMS then determines where the data is held and modifies the value. When the value has been successfully modified, the DBMS returns some indication to the application that the update has been successfully completed. In contrast, the application environment 210 in this embodiment allows the application 220 to directly access and modify objects 240*a-d* in the database 230. In addition, the application environment transparently ensures that concurrent accesses and modifications do not interfere with one another, thus providing the application 220 with high performance database access by eliminating a middle layer, such as a DBMS, between the application 220 and data in the database 230 when accessing objects in the database 230. Thus in this illustrative embodiment, the application environment has functionality of a DBMS and its primary data repository is processor-addressable memory.

Database Memory

In various embodiments, the application environment 210 is configured to allocate database memory to a database 230 of objects 240*a-d*. This database memory is isolated from application memory by the application environment, such that the application may not access the database memory. However, embodiments of the present invention may allow access to the database memory by the application when the application instantiates an object that is to be stored in the database.

In one embodiment of the present invention, the database memory is distributed global address space (DGAS) memory or Distributed Shared Memory (DSM) memory. In computer science, the terms DGAS or DSM refer to the sharing of memory between entities such as applications and processes in addition to each non-shared private memory, or application memory of each such application or process. The database memory may comprise volatile memory such as for instance RAM or other processor addressable memory. Within the database memory, the application environment 210 is configured to maintain a database 230 of database objects 240*a-d*. The database objects are objects that the application requires to be kept throughout multiple application executions. The fact that an object is a database object does not mean that the master storage of said object resides on a persistent memory media. The term database object means that the application whishes to maintain the object so that it can be restored after a loss of power. For computer systems not having fast persistent processor addressable memory such as for example fast solid state memory, the preferred embodiment of the present invention is to keep the database memory in RAM, thus maintaining said database of database objects in RAM where objects are secured to a disk log and a disk image using direct memory access (DMA). The application environment 210 maintains the database 230 by allocating memory to the database, allocating memory within the database memory to new objects created in the database, de-allocating memory from objects that are deleted from the database and ensuring data consistency and providing concurrency features such as transaction isolation when objects in the database are accessed by applications executing in the application environment 210. One embodiment of the present invention allows applications to efficiently share access to data of common objects (database objects) rather than make separate local copies of said data, which may provide more efficient use of the processor-addressable memory available in the system 100. This may also provide improved performance due to the avoidance of copying data between the database memory and the application memory (e.g. the computer language heap).

Referring again to FIG. 1, the system 100 comprises only a limited quantity of processor-addressable memory 130. All applications must execute within the processor-addressable memory 130, and so it may be necessary to efficiently allocate memory 130 among the various applications executed by the system 100. In the embodiment shown in FIG. 1, the processor 120 executes an operating system (not shown) that is configured to manage system resources, such as processor-addressable memory 130, and allocate those resources to one or more applications that may be executed by the processor 120 via the operating system. Thus, the operating system executes within the processor-addressable memory 130, but also allocates processor-addressable memory 130 to applications. In this embodiment, the operating system directly accesses processor-addressable physical memory addresses.

The processor-addressable memory 130 in the system 100 defines a range of processor-addressable physical memory addresses, typically beginning at 0 and continuing with consecutive integers up to the last memory address. For example, in an embodiment having 2 gigabytes (GB) of processor-addressable memory, the processor-addressable physical memory address range begins at 0x0h and ends at 0x7FFFFFFFh. Thus, an operating system, in one embodiment, may request a memory range corresponding to processor-addressable physical memory addresses 0x100h to 0x1000h. When accessing memory locations within the memory range, the operating system may directly address the desired memory location by specifying the desired processor-addressable physical memory address. However, when the operating system allocates memory for an application, it may provide a range of logical memory addresses to the application. For example, an application may expect to begin its computer code at address location 0x1000h. However, because the operating system is already executing, the operating system may already be using processor-addressable physical memory address 0x1000h. Therefore, the operating system may provide a range of processor-addressable physical memory addresses to the application, but map those processor-addressable physical memory addresses to a logical address range. Such a mapping may allow the application to begin its computer code at address 0x1000h in the logical address range, but the operating system may map 0x1000h in the logical address range to, for example, 0x10000000h in the processor-addressable physical memory address range.

Such a mapping technique may allow multiple applications to execute within physical memory, despite having conflicting requirements for memory addresses. For example, a plurality of applications may be executed where each application requires its own computer code to begin at 0x1000h. By providing logical address ranges corresponding to different processor-addressable physical memory address ranges to each application, the operating system may allow each application to begin its computer code at 0x1000h within each respective logical address range.

Memory mapping techniques thus provide a level of abstraction from the physical hardware of the system 100. In the example above, each application appears to be executing beginning at a processor-addressable physical memory address of 0x1000h, however, because of the memory mapping employed, the true processor-addressable physical memory address of the memory is not important to the application, so long as the operating system correctly maintains the mapping.

It is further possible to employ layered mappings. For example, in one embodiment, the operating system may execute an application environment within a mapped memory range. The application environment may then in turn execute one or more applications within the application environment's mapped memory. In such an embodiment, the application environment provides a logical memory range within the application environment's memory to the one or more applications. Thus, to determine processor-addressable physical memory address corresponding to one of an application's logical memory addresses, it is necessary to map from the application's logical memory address to the application environment's logical memory address, and then from the application environment's logical memory address to a processor-addressable physical memory address. Thus, there are two layers of abstraction, and still greater levels of abstraction may be employed.

Such memory mapping techniques may be advantageous in embodiments of the present invention because these techniques may allow more efficient allocation of physical memory to applications executing in processor-addressable memory. For example, in one embodiment, a database may be allocated within a logical address range within the application environment's memory. Each of the applications executing within the application environment may each be allocated its own logical address range. Because the application environment provides transparent access to the database memory from each application, each application may need to use less physical memory for its own data storage. Instead, each application may employ memory within the database memory. And because in one embodiment, each application is able to access all of the objects within the database, applications may efficiently share memory, rather than maintaining individual copies of the shared objects.

For example, in a conventional in-memory DBMS, a database is maintained in RAM and each application obtains a copy of desired objects from the DBMS. Thus, physical memory is needed for the object in the database as well as for each copy of the object requested by an application. However, embodiments of the present invention may reduce or eliminate the need for applications to maintain copies of database objects—each application directly accesses the objects in the database without first making a local copy—thus providing savings of the limited processor-addressable memory.

However, as discussed in detail below, some types of processor-addressable memory may be susceptible to data loss in the event of power failure. Thus, referring again to FIG. 1, this illustrative embodiment comprises a non-processor-addressable persistent storage medium 140 as backup storage for the contents of the processor-addressable memory. The persistent storage medium 140 is used to store objects 240*a-d* to help prevent data loss. In the embodiment shown in FIG. 1, the persistent storage medium 140 comprises a hard drive. Because the application environment 210 allows applications to directly access objects in the database 230, reading data from or writing data to the object does not involve accessing the persistent storage medium 140. However, to provide backup storage of the objects 140*a-d*, updated object values are stored in the persistent storage medium 140. Thus, persistent memory is used only to hold updates made to the database objects 240*a-d* or to restore the objects 240*a-d* to the database 230 after a power loss or other failure.

When an application creates a new object in the database 230 or updates an instance attribute value in a previously instantiated object, the application environment 210 stores memory locations corresponding to end points of database memory ranges with updated or new objects. For example, if an application 220 instantiates a new object 240*d* in the database 230, the application environment 210 stores a starting address location corresponding to the first address location of the new object 240*d*. The application environment 210 also stores an ending address location corresponding to the last address location of the new object 240*d*. The application environment 210 then sends a signal to the persistent storage controller 150 indicating that data is available to be stored on the persistent storage medium 140.

In this illustrative embodiment, the persistent storage controller 150 reads the starting and ending address locations and, using a direct memory access (DMA), reads all of the data from the address locations beginning at the starting address location and ending with the ending address location from the processor addressable memory 130. The persistent storage controller 150 writes the data read from the processor-addressable memory 130 to the persistent storage medium 140. In this illustrative embodiment, the persistent storage controller 150 writes the data in sequential address locations on the persistent storage medium 140, thus providing an up-to-date backup of the in-memory object database 230. Thus, volatile memory may be used effectively as master storage in some embodiments by maintaining a non-volatile back-up of the contents of the volatile memory.

Volatile Memory as Database Master Storage

In one embodiment of the present invention, volatile random access memory (RAM) is used to provide master storage for the database. However, because conventional DRAM loses its contents when it loses power, it may be necessary to provide for a backup of the database storage on a persistent medium. For example, in one embodiment, a persistent storage medium is read on startup to load the in-memory master storage, and data is copied from master storage to disk when data updates are committed via a transaction log. In addition to the transaction log, one embodiment of the present invention uses a database image on disk to where data is written asynchronously. By providing an occasional safe checkpoint to said asynchronous database image, the transaction log can then be truncated. In one embodiment, an efficient way to implement the database image is memory paging to disk (dirty pages being written to disk and unknown pages being read from disk) by means of the virtual addressing system of the CPU. A method to perform the reading and writing to disk is using so called direct memory access (DMA) whereas the hard drive controller can read and write to the processor addressable volatile memory without having all data being processed by the CPU. The foregoing are merely examples on how to secure master storage residing in volatile memory and other mechanisms are within the scope of the present invention.

In some embodiments of the present invention, the master storage of the committed value always resides in database memory whereas the master storage of a pending update may reside in any memory. In one embodiment of the present invention, the master storage of an attribute of a single object may, during a pending update transaction, contain a different version of a single attribute because both the pending transaction and the database have their own value of the attribute. In one embodiment of the present invention, all versions are hosted in master storage. One advantage of such an embodiment may be that the database index structures used for the expedient execution of database queries may also work on objects and changes that are private to a code segment execution that has yet not been committed and is thus not visible to other transactions. In addition, systems and methods disclosed herein provide for searching functionality to allow applications to search for data within the database.

However, one of the issues to be addressed when using processor-addressable memory, as used in some embodiments disclosed herein, is that access to non-local address space must be provided by the application environment. Many conventional computer systems are capable of multi-tasking, or executing a plurality of applications substantially simultaneously. To allow multitasking, each application is allocated to its own local memory area. Each local memory area references memory locations within a processor-addressable memory, however, a translation from a local memory location to a physical memory location is usually needed. Each application is free to use its own local memory as necessary, to request additional local memory, or to release unneeded local memory; however, applications are typically not allowed to access external memory areas. Attempts to access such external memory locations usually result in an error or a fault. Thus, applications that allocate additional memory for use will allocate memory that becomes local to the application—the newly allocated memory will be visible and useable by the application—and the memory becomes unusable to other applications. Thus the memory may not be allocated by other applications and may not be accessed by other applications.

However, embodiments of the present invention disclosed herein provide a mechanism to allow a computer language runtime to use the functionality of a transactional DBMS as a replacement or a complement to the heap of the computer language runtime. This may allow objects of the computer language runtime to store object attribute data directly in the database without copying the data to the heap. Many conventional applications use a computer language runtime and a DBMS, and store copies of database data in the application's local heap memory. In these cases a specific piece of information may be stored in more than one memory at the same time. For example, the name of a person in a person object having a name attribute in a person class may be stored both in a database image residing on disk and at the same time in a dynamically allocated business object in a Java virtual machine runtime heap. The data may be further duplicated in other memories as for example a database cache and a disk cache. This can be undesirable because it requires the use of memory to store each copy, requires the application to track the use of memory allocated to copies of objects, and requires a developer to generate database calls to ensure the data stored in the local copy is up-to-date.

Figure 3:
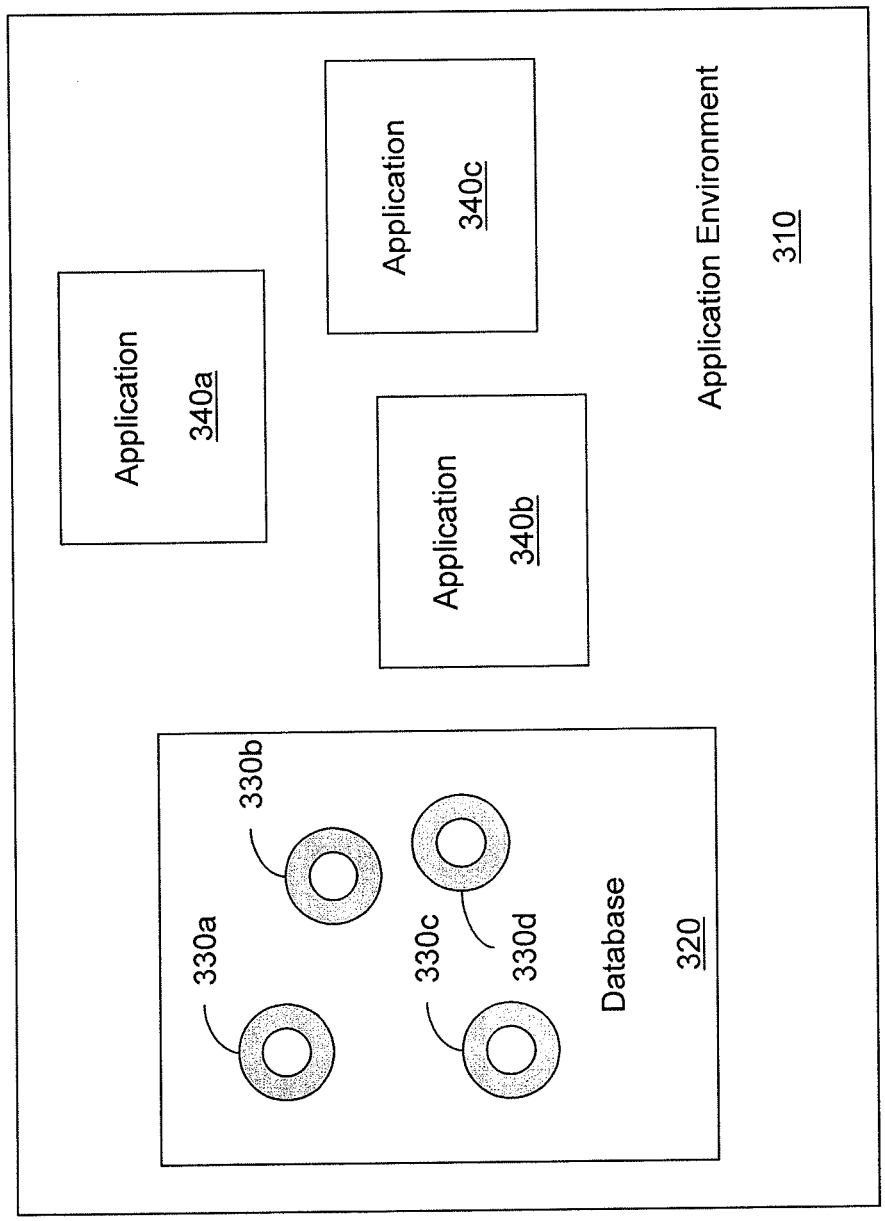
FIG. 3 shows a diagram of an application environment according to one embodiment of the present invention.

Referring now to FIG. 3, FIG. 3 shows an application environment 310 according to one embodiment of the present invention. FIG. 3 will be described with reference to the system 100 shown in FIG. 1.

The application environment 310 is allocated memory in the processor-addressable memory 130 and executed by the processor 120. The application environment 310 is configured to maintain a database 320 in a database memory within the application environment memory. For example, in one embodiment, the application environment allocates application environment memory to the database 320. However, the database's memory corresponds to physical memory locations in the processor-addressable memory 130. In addition, the application environment 310 is configured to allocate memory for applications 340a-c within the application environment memory. In another embodiment, the application environment allocates memory for the database 320 by allocating additional application environment memory and assigning it to the database 320.

As discussed above, each application 340a-c executes within its local memory and does not have access to external memory locations; each application's respective local memory is isolated from every other application's memory. As such, as each application needs to allocate memory during its execution, it requests memory. The allocated memory then becomes local to the application and, consequently, inaccessible to every other application. However, because memory allocations within the context of the application environment 310 are handled by the application environment 310, the application environment 310 can control how memory is allocated in response to an allocation request. Thus, in one embodiment, in response to a request for a memory allocation from an application, the application environment 310 is configured to assign newly-allocated memory to the database 320 and to provide access to the object as though the object is within the applications local memory.

For example, in one embodiment, an application 340a instantiates a new object and requests memory for the new object. In response, the application environment 310 allocates memory to the database 320 and provides an address location of the new object in the database memory to the application 340a. After receiving the address location, the application 340a can access the new object as though the address location associated with the new object is within the application's memory. As noted above, such a memory access outside of the application's local memory would typically not be allowed. However, the application environment enables the application to access the object. Thus, from the perspective of the application, the memory access is performed in the same fashion as any access to a memory location within the application's local memory.

The use of the phrase "as though" above and throughout this specification is intended to indicate that the application is able to access the object in the database memory using the same computer language operators used to access memory in the application's local memory. Stated differently, the application does not need to communicate with an external process or use an application programming interface (API) to access the object in database memory. Further, during development the application developer need not be concerned with how the memory allocations are handled during execution. For example, in the computer language C#, data values within an object in local memory may be accessed using the following statement:

a=b.Age;

This statement copies the value of the "Age" instance attribute of the object "b" into the variable "a". The operation "b.Age" directly accesses the memory location within the "b" object that holds the "Age" value. The operation "a=" causes the value held in the "b.Age" memory location to be copied into the "a" memory location. Using embodiments disclosed herein, the object "b" could be held in the application's local memory or in the database memory. The statement to access the object in either case is the same. Thus, the application is able to access the new object in the database as though the new object were in the application's local memory.

Since embodiments of present invention provide DBMS functionality, some embodiments allow multiple entities, such as applications, threads, or code segments, access to a single object in a database. In one embodiment, the application environment 310 is configured to provide an address location of an object in the database in response to a request for the object. Thus, requests from a plurality of entities for the same object may occur. In one embodiment, a plurality of applications may each request access to the same object in the database. For example, a plurality of entities may each request an object having an ObjectID of 1. In such a case, the address location corresponding to the object with an ObjectID of 1 is provided to each of the applications by the application environment. Because only one object in the database may have an ObjectID of 1, a reference to the same object is returned to each requesting entity. In another embodiment, one application comprises a plurality of threads. In such an embodiment two or more of the threads may access to the same object in the database. In such a case, the address location corresponding to the object is provided to each of the threads.

As described above, some embodiments disclosed herein provide an address location of an object in the database to a requesting entity, such as an application, a thread, or a code segment. However, because the application environment 310 may execute applications written in different computer languages, when written, each application may request objects using different mechanisms. For example, in C++, an application may access an object by using a pointer reference to an address location provided by the application environment 310. However, in a Java application, the application may access an object by using an object reference provided by the application environment 310. In each case, a memory address location is provided to the application, however, the application developer may be using a computer language that does not explicitly use memory address locations, such as Java or C#. Thus, a developer may not be aware that the application environment is providing an address location and may instead request an object reference. However, the application, when executing, will be accessing database objects based on memory address locations regardless of the programming language used to develop the application.

After an entity has obtained an object from the database, embodiments of the present invention may allow the entity to perform operations on the object. For example, in one embodiment, an application environment 310 is configured to allow the entity to modify an instance attribute of an object in a database 320 by directly changing the value held in the instance attribute.

In one embodiment of the present invention, an application environment may comprise a language runtime with the features of the present invention integrated as an integral part of the language runtime. An application environment may also be defined as an implementation of the features of the present invention that cooperates with an external computer language runtime such as, for example, a Java Virtual Machine. An example of an application environment embodiment is an object oriented DBMS or an object relational DBMS that cooperates with at least one external computer language runtime. In one embodiment, the application environment makes use of a conventional virtual machine, such as for example Microsoft .NET Common Language Runtime or the Java Virtual Machine. In such an embodiment the bytecode, such as for example Microsoft Intermediate Language (MSIL) code or Java bytecode, is altered by the application environment such that the DBMS subsystem can effectively replace the heap for database objects, database classes and/or special database instantiations. For example, code segments accessing instance attributes are altered such that the bytecode instead accesses the DBMS subsystem.

The following code example illustrates in C# what modification might be done of the bytecode. The first code segment below is an example of a definition of a database class "MyClass" in C#. The second code segment below is an example of how the first code segment could look like after a compilation to bytecode, a modification of the bytecode where accesses to the instance attribute "Value" are replaced with accesses to the DBMS subsystem, and for illustration purposes decompiled back to C#.

```
//Class definition
public class MyClass : Persistent
{
    public int Value;
}
//Compiled, modified and decompiled class definition
public class MyClass : Persistent
{
    get
    {
        return DbState.ReadInt32(this, 3);
    }
    set
    {
        DbState.WriteInt32(this, 3, value);
    }
}
```

Such an alteration of bytecode can for example be done when loading the assemblies or packages into the application environment. In one embodiment, the bytecode is altered when loading the Dynamic Link Library (DLL) containing MSIL code or the package file containing the Java byte code. In one embodiment the byte code is modified before loading it into the Java Virtual Machine or the Microsoft .NET Common Language Runtime.

In one embodiment, an application 310 is configured to allow an entity to delete an object within a database 320. For example, an application may receive an indication that a customer object is to be deleted from the database 320. The application may delete the object from the database. For example, a C# application may delete an object using a statement similar to the following:

Customer.Delete( );

Such an embodiment allows the entity to directly delete the object from the database rather than issuing a DBMS command or API call to request the object be deleted.

Because systems and methods according to one embodiment of the present invention allow multiple entities to access a single object substantially simultaneously, it may be possible for multiple entities to attempt to update an object simultaneously, either with a direct update of an instance attribute or by executing a member function. Thus, embodiments may employ the concept of transactions to mediate concurrent access to objects in a database.

Class Instance Transactions

In a conventional computer language runtime, such as for example Java or C#, changes to the attribute data of a class instance, such as the data of a field of an object in C#, will be visible directly to any code segment reading the attribute data. This can make it difficult to provide atomic updates to a set of class instances and/or a set of attributes and the use of locking may affect concurrency adversely.

As discussed above, embodiments of the present invention may allow multiple entities to access the same class instance pertaining to the database 320 concurrently or substantially simultaneously. In a case where multiple accesses to a single data item are read accesses and no updating transactions are pending, concurrency control is not necessary. Data is read from the same source in memory. In other words, both entities access the data from the same address location. However, if one or more concurrent writes are attempted for the same data value or if an entity attempts to read a data value that has been changed but not committed by another entity, conflicts can arise and concurrency control is generally desirable. To provide for concurrency control, embodiments of the present invention may employ transactions to mediate access to data for class instances.

In one embodiment, an application environment 310 receives a signal from an application indicating that a new transaction is being initiated. A transaction is referred to herein as having "scope". A transaction's scope comprises all operations performed by the code segment that has initiated the transaction between the beginning of the transaction and the end of the transaction. A transactional scope may also comprise other components commonly understood to be associated with a particular scope, including variables local to the scope.

For example, according to one embodiment, a C# application may manage a transaction as follows:

```
class Application
{
    public void main( )
    {
        transaction
        {
            Customer c = new Customer( );
            c.Name = "Acme Industries";
            c.Address = "12 Flower Street";
            Product p = new Product( );
            p.Description = "Coca Cola 33cl";
            Order o = new Order( );
            o.Customer = c;
            OrderRow or = new OrderRow( );
            or.Order = o;
            or.Product = p;
        }
    }
}
```

In the code sample set forth above, an application opens a transaction at the opening brace and closes the transaction at the closing brace immediately following the "or.Product=p;" statement. The transactional scope comprises the statements between the opening and closing braces of the transaction. When application execution reaches the transaction, the application environment receives a signal indicating that a new transaction is beginning. Within the transactional scope, the application instantiates four new objects and assigns values to instance attributes of each of the four new objects. Because the instantiations occurred within a transactional scope, the application environment receives signals indicating that new objects are being instantiated within the database, and the application environment allocates memory for the database 320 to hold the four new objects. The application environment then provides an object reference (corresponding to a memory address in the database memory) that is held in a variable local to the transactional scope. Once the application execution reaches the end of the transaction, the application environment receives a second signal indicating that the transaction has completed. The application environment then attempts to commit the database changes made within the transaction. In the example shown above, the application environment will attempt to set the instance attribute values of each object to the values assigned within the transaction. Assuming that only one entity is attempting to update the object values, the values will be successfully written to the objects and made available to the application, and other applications, in the database 320.

In an unmodified existing computer language runtime such as in Microsoft .NET Common Language Runtime defining the transactional scope may for example be done in one of the following ways.

```
[TransactionScope]
void Foo( )
{
    // Inside a transactional scope.
    // ...
}
void Foo( )
{
    Scope.WithTransaction(
        delegate
        {
            // Inside a transactional scope.
            // ...
        }
    );
}
```

While in some cases only one entity will attempt to access an object at a time, at other times, two or more entities may attempt to update an instance value of an object in the database substantially simultaneously causing a transaction conflict. Embodiments of the present invention may employ concurrency controls to resolve such concurrent accesses. For example, in one embodiment, an application environment is configured to handle two or more transactions substantially simultaneously. In such an embodiment, the application environment may employ an "optimistic" concurrency resolution scheme.

In such an embodiment, the optimistic concurrency control allows a first transaction to freely modify values stored in a database. However, at the time the first transaction is committed, a check is made to determine whether the value had been updated by another transaction between when the first transaction began and when the commit occurred. If the value has not been updated by another transaction during this interval; the commit is successful and the values are stored in the database, otherwise the commit fails. This scheme is referred to as optimistic because it assumes that all updates will be accepted and only checks just before making the changes in the database.

However, because updates to database values are allowed prior to a transaction being committed, a separate copy of an instance attribute must be created to hold the pre-commit updated value. This allows a second transaction to read the data value from the object before the first transaction commits its updated value. In such a case, in one embodiment, a copy of the instance attribute is created to hold the new value from the first transaction. However, only one copy of the object exists in the database—the copy of the instance attribute is used to ensure the different transactions remain isolated until the update is committed. That new value is only used by the first transaction; the second transaction continues to access the original copy of the instance attribute. When the first transaction commits the change the globally-accessible instance attribute is updated and the copy of the instance attribute is discarded leaving only a single copy of the instance attribute within the object.

Some embodiments may employ other concurrency mechanisms. For example, in one embodiment, an application environment may employ a type of pessimistic concurrency mechanism. In such an embodiment, within a transaction, at the time any database changes are attempted, the application environment attempts to immediately lock the object being modified. If the object is not already locked, the lock is successful and updates may be freely made. When the transaction concludes, the lock is released and the object may be accessed by other transactions. In such an embodiment, the application environment prevents other transactions from locking the object for the entire duration of the object access, rather than just long enough to update the values. Thus, it is more likely that other transactions attempting to update the object will fail or will wait for the object to be unlocked. However, it ensures that the transaction that locks the object will not interfere with other transactions attempting to update the same object. Various embodiments of the present invention comprise optimistic or pessimistic concurrency control. However, still further concurrency control mechanisms may be employed in other embodiments.

Database Queries

As is known by those of skill in the art, some DBMSs are capable of receiving queries for data stored within a database. For example, relational databases are typically managed by a relational DBMS that is configured to receive standard structured query language (SQL) commands that can comprise queries for data stored in a database. Object DBMSs employ similar DBMS facilities that also can provide SQL capabilities. Similarly, embodiments of the present invention are capable of receiving SQL queries for data stored in a database. However, unlike data accesses described above that directly access objects in a database without invoking a command within a DBMS, queries according to embodiments disclosed herein comprise DBMS commands.

In one embodiment, a system 100 is configured to receive and execute queries from an application. For example, in the embodiment shown in FIG. 3, the application environment 310 is configured to receive a SQL request for a set of objects from the database 320 from an application 340a-c. The application environment 310 is configured to determine zero or more objects that satisfy the request, and provide a response to the standard structured query language request. For example, an application 340a-c may comprise the following computer language code:

```
SELECT or.Order.Customer.PrintAddressLabel( )
FROM OrderRow or
WHERE or.Product.Description = 'Coca Cola 33cl'
```

In the embodiment shown above, the SQL query is configured to execute a function "PrintAddressLabel( )" for every "OrderRow" object in the database 320, such that the "Order- Row" object has a reference "Product" to an object having an instance attribute "Description" with a value of "Coca Cola 33c1" and the "OrderRow" object has a reference "Order" to an object with a reference "Customer" to an object with a member function "PrintAddressLabel ( )". In one embodiment, an application environment 310 is configured to receive an SQL query, such as the query above. The application environment is configured to identify zero or more objects that satisfy the query. For example, in the SQL query shown above, the application environment 310 is configured to identify every "OrderRow" object in the database that has a product description of "Coca Cola 33c1". In another embodiment, a SQL query may request address locations of a set of objects be returned to allow the application to use data stored in the set of objects.

An advantage of some embodiments of the present invention may be that a structured query (for example SQL) can be issued on data that has yet not been committed in the same efficient way as committed data. Thus the object oriented programming language code can maintain a single model regardless of if it is working with database objects or non-database objects and the query language can maintain a single model regardless of whether data is committed for storage or only temporary in a pending transaction.

In addition, in a conventional application, the developer must provide the necessary tools to find the desired objects. For example, the developer may need to provide search capabilities within the application to find a desired object. Or, the developer may need to implement concurrency controls to mediate access to application data, such as in a multi-threaded application. However, by using an embodiment of the present invention, an application developer may create all of the applications objects within the database, but have no need to track their location because the application environment maintains that information. Further, to select particular objects, the application developer can use the query capabilities of the embodiment to retrieve any needed objects, rather than developing his own query capabilities. Thus, one advantage of the present invention may be that the database appears to simply be the application's local data memory (also commonly referred to as a heap), but with additional functionality such as concurrency controls and global accessibility. Thus, database objects are created transparently using conventional computer language operators without the developer needing to learn the mechanics of a DBMS, and the developer has no need to track the location of these objects because they are managed transparently by the application environment. While an object is in use by an application, the application treats the object as though the object is in its local memory. When the application is done using the object, it can simply re-assign the application's object reference variable to the next object without needing to maintain the location of the object. If the application later needs to retrieve the object, a SQL query may be issued and the object can be retrieved. Or the object can be retrieved using other methods described herein.

Thus, embodiments of the present invention provide not only high-speed, transparent, direct access to objects within the database without an intermediate layer, but also provide the query capabilities of conventional DBMSs.

Persistent Data Storage

Embodiments of the present invention use processor-addressable memory as the primary storage location of database objects. However, as noted above, most processor-addressable storage currently in use is vulnerable to data loss due to power outages. Thus, it may be advantageous to provide a secondary storage location for the database objects to guard against data loss in processor-addressable storage. Embodiments disclosed herein comprise non-processor-addressable storage devices as secondary, or backup, storage for database objects.

Referring again to FIG. 1, FIG. 1 comprises a persistent storage controller 150 in communication with a processor 120 and a persistent storage medium 140. The persistent storage medium 140 comprises a non-processor-addressable memory. The persistent storage controller 150 is configured to receive signals from the processor 120 indicating that database objects are to be stored in the persistent storage medium 140. For example, in one embodiment, the persistent storage controller is configured to receive a signal indicating a starting memory location and an ending memory location, the starting memory location indicating a memory location at the beginning of a contiguous range of processor-addressable memory locations and the ending memory location indicating the memory location at the end of the contiguous range. After receiving the signal, the persistent storage controller 150 is configured to read every successive memory location beginning with the starting memory location and stopping with the ending memory location. In one embodiment, the persistent storage controller 150 reads the memory locations through a direct memory access (DMA).

The persistent memory controller 150 is also configured to write the data read from the contiguous range of processor-addressable memory locations to consecutive memory locations on the persistent storage medium 140. For example, in one embodiment the persistent storage medium 140 comprises a hard drive. A conventional hard drive comprises one or more platters with electromagnetically-controllable surfaces capable of storing data and an arm having one or more read/write heads. The arm can be moved to allow the read/write heads to be positioned along a path from an inner portion of the platters to the outer portion of the platters.

Data on a hard drive is typically stored on a plurality of concentric circular tracks, with one track near the outer edge of the platter, and one near an inner edge. Thus, as the platters rotate, the tracks pass by the read/write heads of the arms, which can be moved to access any of the tracks on the platter. Thus by rotating the platters and moving the arms, any location on the platter may be read or written as the location rotates past the read/write head.

In some embodiments, it may be possible to take advantage of the platter rotation to achieve high data throughput. For example, in one such embodiment, the persistent memory controller 150 comprises a hard drive controller. The hard drive controller is configured to use a DMA transfer to transfer data from a processor-addressable memory onto the hard drive. A suitable location on a track of one of the hard drive platters is selected to begin data writes to the hard drive is selected. Data is then written to consecutive locations on the track. When no more consecutive locations are available on the track, the arm moves the read/write heads to an adjacent track and the data is written consecutively to the next track. This process continues until all of the data is written to the hard drive. Because data is written consecutively on adjacent tracks, very little arm movement is needed, and data can be written at a rate approximately equal to the rate at which data locations pass by the read/write heads as the platters spin. Thus, it may be possible to transfer a large amount of data from the in-memory database to the hard drive quickly.

Methods for Managing Databases

Figure 4:
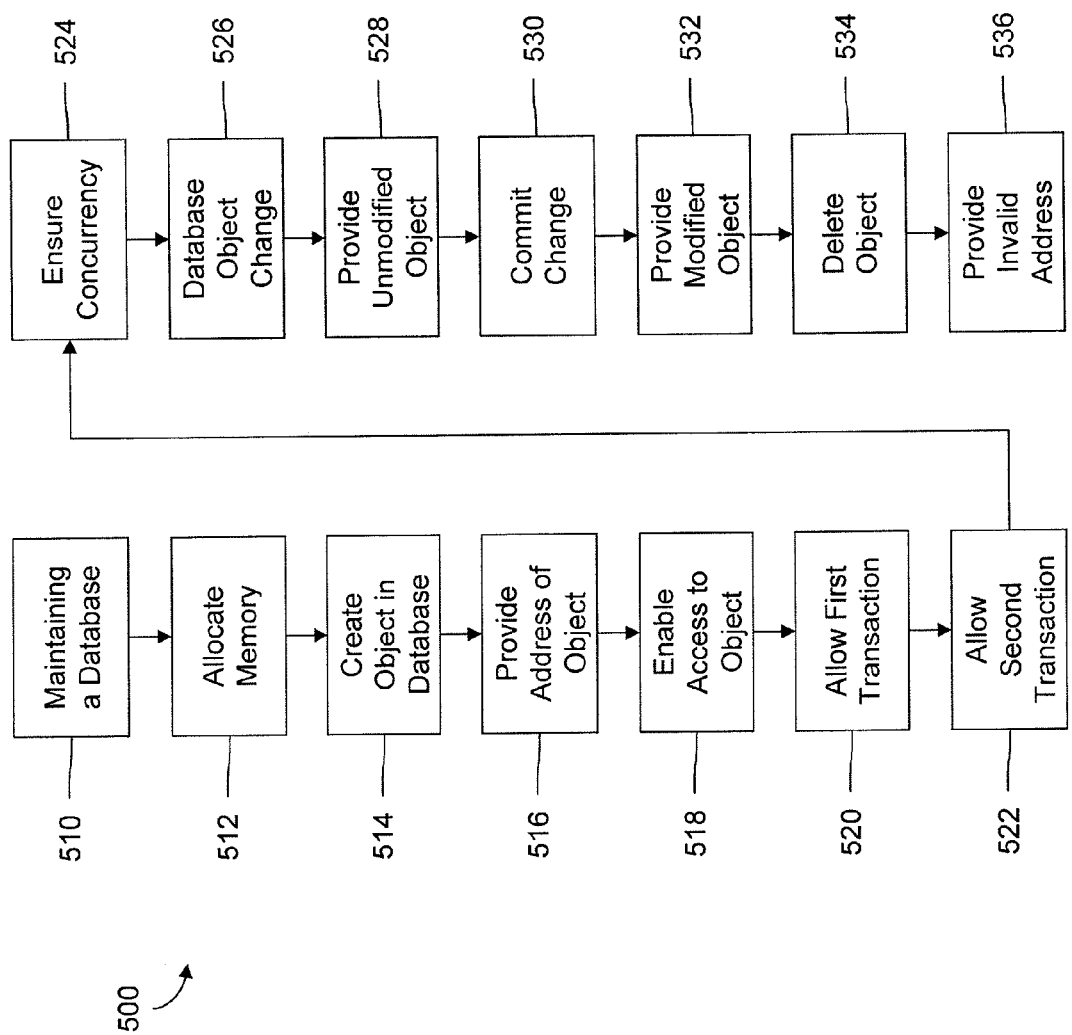
FIG. 4 shows a method for managing databases according to one embodiment of the present invention.

Referring now to FIG. 4, FIG. 4 shows a method for managing database according to one disclosed embodiment. The embodiment shown in FIG. 4 will be described with respect to the system 100 shown in FIG. 1 and the diagram shown in FIG. 3.

The computer-implemented method 500 shown in FIG. 4 is configured to be executed by an application environment 310 that has been allocated an application environment memory. The method begins with block 510 with the application environment 310 maintaining a database 320 of objects in a database memory within the application environment memory. In one embodiment, the application environment 310 maintains the database 320 by allocating memory to the database 320, allocating memory to new objects created in the database 320, and de-allocating memory from objects that are deleted from the database 320. In one embodiment, the application environment 310 ensures data consistency when objects in the database 320 are accessed by applications executing in the application environment 310.

In one embodiment, the application environment 310 also maintains the database 320 by handling transactions. For example, in one embodiment, the application environment 310 receives a signal indicating the beginning of a transaction and receiving a signal indicating the ending of a transaction. In some embodiments, the application environment 310 also maintains the database 320 by providing facilities to store data from processor-addressable memory to non-processor-addressable memory. For example, in one embodiment, the application environment stores memory locations indicating the beginning and ending of a contiguous range of processor-addressable memory with data to be stored in the persistent storage medium 140. In such embodiments, the application environment 310 may also transmit a signal to the persistent memory storage controller 150 to cause the data in the contiguous memory range to be stored in the persistent storage medium 140. In some embodiments, the application environment 310 may transmit a signal to the persistent storage controller 150, the signal comprising a first address location and a second address location indicating a contiguous range of processor-addressable memory with data to store on the persistent storage medium 140. In some embodiments, the application environment 310 may transmit a plurality of starting memory address locations and ending memory address locations indicating a plurality of contiguous ranges of processor-addressable memory with data to be stored in the persistent storage medium 140.

In block 512, the application environment 310 allocates memory for an application 340a. The application environment 310 executes the application 340a within the allocated memory and within the context of the application environment 310. To execute the application 340a, the application environment 310 allows the application 340a to allocate additional application memory for data. In one embodiment, when the application environment 310 allocates application memory for an application 340a, the application memory is isolated from the database memory such that the application 340a is configured to only allocate memory within its respective application memory. For example, in one embodiment, an application environment 310 executes an application 340a that allocates additional local memory for data. In such an embodiment, the application environment 310 allocates additional memory to the application 340a within the application's respective application memory.

In block 514, the application environment 310 is configured to receive a signal indicating that an object is to be created in the database 320. In one embodiment, the application environment 310 receives the signal from an application 340a. In one embodiment, the application environment 310 receives the signal from an entity. In one embodiment, the signal comprises parameters indicating the amount of memory needed for the object and information to be held in the object at specific locations upon instantiation. For example, the information may comprise initial values for one or more instance attributes associated with member functions of the object. In such an embodiment, the application environment 310 allocates database memory based on the parameters for the new object. In addition, if the signal comprises information to be held in the new object, the application environment 310 stores the information within the new object at the specified locations.

In block 516, upon creation of the new object in the database 320, the application environment 310 provides access to the new object to the application 340a as though the object is within the application's local memory. For example, in one embodiment, the application environment 310 provides access to the new object by providing an address location of the new object in the database memory to the application 340a. In such an embodiment, the address of the new object is referenced by a variable in the application 340a, and by accessing the variable the application accesses the new object. In one embodiment, the application environment 310 provides an object reference to the new object. In one embodiment the application environment 310 provides a pointer reference to the new object.

After the application has provided the address of the new object in the database, the method 500 moves to block 518. In block 518, the application environment 310 enables access to the new object. For example, in one embodiment, after providing a reference to a database object, the application environment allows the application 340a to access database memory to access attributes of the object or execute methods of the object.

In block 520, the application environment 310 receives a first transaction signal indicating the beginning of a first transaction. In one embodiment, in response to the first transaction signal, the application environment 310 creates an entry in a transaction log indicating that a new transaction has begun. The application environment 310 may also add an entry to a transaction list. For example, in one embodiment, the entry may be stored in a hash table of transactions. In one embodiment, the transaction may have a hash value associated with it. After receiving the first transaction signal, the application environment 310 may allow the execution of a first code segment in the scope of the first transaction.

After the first transaction has begun, the method proceeds to block 522 where the application environment 310 receives a second transaction signal indicating the beginning of a second transaction. In one embodiment, in response to the second transaction signal, the application environment 310 creates an entry in a transaction log indicating that a new transaction has begun. The application environment 310 may also add an entry to a transaction list. For example, in one embodiment, the entry may be stored in a hash table of transactions. In one embodiment, the transaction may have a hash value associated with it. After receiving the second transaction signal, the application environment 310 allows the execution of a second code segment in the scope of the second transaction.

In block 524, the application environment 310 ensures that the first and second code segments each read the same value from an instance attribute of the new object when accessing the object. For example, in one embodiment, the application environment 310 allows entities to change values of instances variables of objects stored in the database 320. In such an embodiment, the first and second code segments may each attempt to read a value of an instance attribute of an object in the database 320. While the first and second code segments each attempt to read the value, a third code segment in the scope of a third transaction may attempt to modify the value. If both the first and second code segments each read the value before the modification of the value is committed, the first and second code segments each read the same unmodified value. Similarly, if both the first and second code segments each read the value after the modification of the value is committed, the first and code segments each read the same modified value. However, if the first segment reads the value before the modification is committed, and the second code segment reads the value after the modification is committed, the first and second code segments will each read a different value. In one embodiment of the present invention, the application environment ensures that code segments accessing an object instance attribute will each read the same value, unless one or more code segments are modifying the value within a transactional scope. In such a case, all code segments that are not modifying the value will read the same value, however, any code segments within a transactional scope that are modifying the value will read the modified value. Once the modification is committed, the modified value will then be available to other code segments.

Blocks 526-534 will be described with respect to FIG. 5, which shows a sequence diagram for a method for managing databases according to one embodiment of the present invention. In block 526, the first code segment attempts to modify an instance attribute of the new object. For this example, the unmodified value of the instance attribute "Size" is "Medium". The application environment 630 enables the first code segment 610 to directly update the instance attribute 640 using a native computer language operator by determining that the modification is within the first transactional scope and creating a copy 650 of the instance attribute associated with the first transaction. The new value for the instance attribute is stored in the copy 650 of the instance attribute. The first code segment 610 continues to access the copy 650 of the instance attribute for the duration of the first transaction. However, other code segments, such as the second code segment 620, continue to access the original instance attribute 640. In such an embodiment, an entity that reads the instance attribute 640 reads the unmodified value of the instance attribute 640, even though the first code segment 610 has, from its perspective, changed the value of the instance attribute 650.

Figure 5:
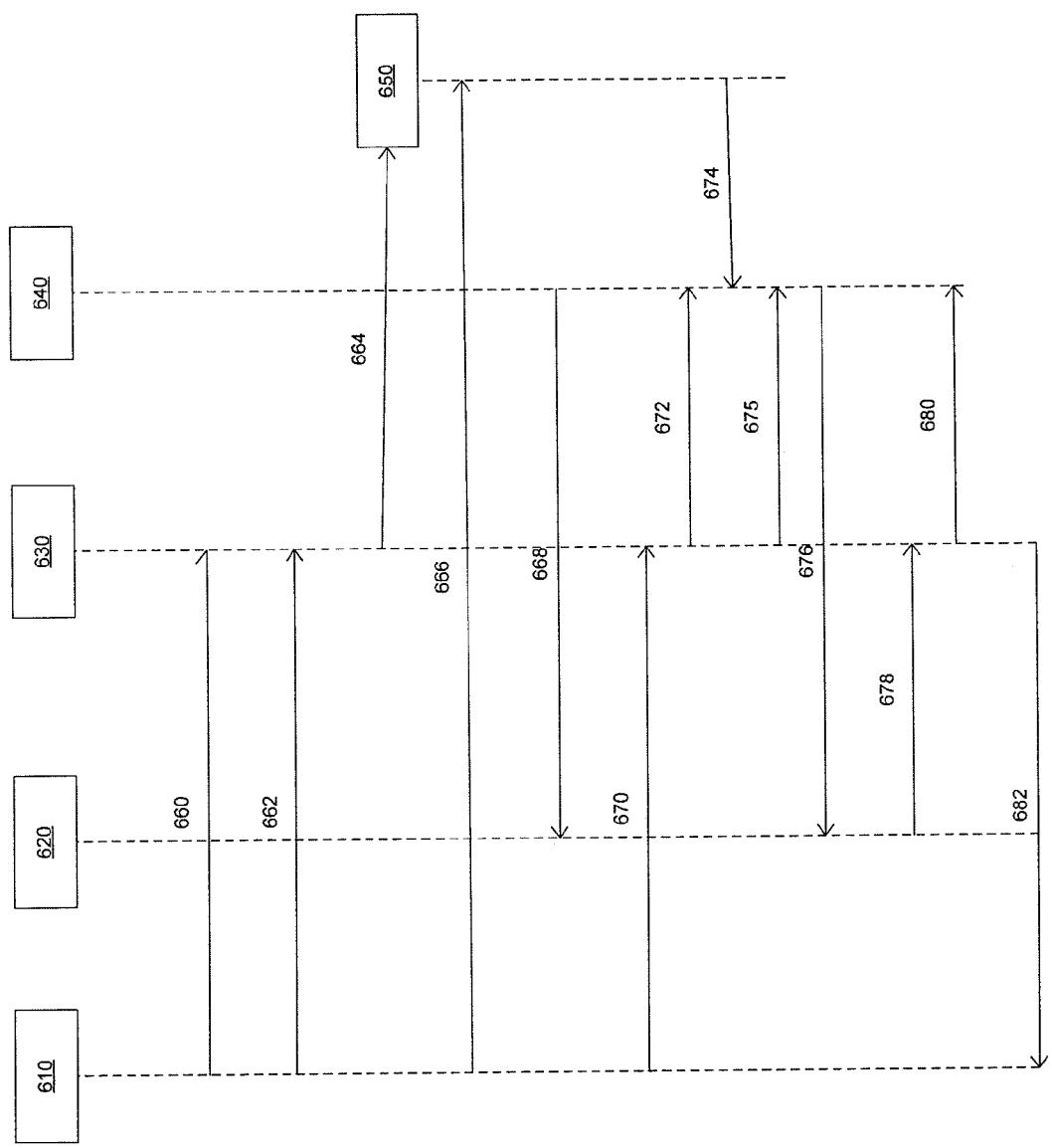
FIG. 5 shows a sequence diagram for a method for managing databases according to one embodiment of the present invention.

As can be seen in FIG. 5, the application environment 630 receives a signal 660 from the first code segment 610 indicating that a transaction is beginning. For example, the first code segment 610 may comprise the statement "transaction {". The application environment 630 then receives a signal 662 indicating an update of an instance attribute 640 during the transaction. For example, the first code segment 610 may comprise the statement "orderitem.Size="Large"". The application environment 630 creates 664 a copy 650 of the instance attribute and causes the first code segment 610 to use the copy 650 of the instance attribute. The copy 650 of the instance attribute 640 then receives 666 the modified value from the first code segment 610.

In block 528, the second code segment 620 reads 668 the value of the instance attribute 640 of the new object that is being modified by the first code segment 610. In one embodiment, the application environment 630 provides the unmodified value of the instance attribute 640, despite the fact that the first code segment 610 is modifying the value of the copy 650 of the instance attribute. For example, the second code segment comprises the statement "size=orderitem.Size". Thus, after reading the value of the instance attribute, the variable "size" will have the value "Medium". In such a circumstance, because the modification has not yet been committed, other accesses of the instance attribute from other entities will also read the unmodified value of the instance attribute 640.

In block 530, the application environment 630 receives a signal 670 from the first code segment 610 indicating that the transaction has concluded and the modified value should be committed to the instance attribute 640 of the object. For example, the first code segment may comprise the statement "}", corresponding to the open brace of the transaction. In one embodiment, the application environment 630 locks the object 672, copies 674 the value from the copy 650 of the instance attribute to the instance attribute 640 and unlocks the object 675. After the commit has concluded, the new value of the instance attribute "Size" is "Large". In one embodiment, the applications uses a pessimistic locking mechanism and locks the object when it receives the signal from the first code segment 610 indicating the beginning of a transaction, and unlocks the object after copying 674 the modified value from the copy 650 of the instance attribute into the instance attribute 640.

In block 532, the application environment 630 provides the updated value of the instance attribute 640 to the second code segment 620 after the update is committed. In the embodiment shown in FIG. 5, the second code segment 620 reads 676 the modified value from the instance attribute 640. For example, the second code segment comprises the statement "size=orderitem.Size". Thus, after reading the modified value of the instance attribute, the variable "size" will have the value "Large". Thus, in one embodiment, the application environment 630 ensures that a second code segment 620 reads an unmodified value of an instance attribute while a first code segment 610 modifies the instance attribute but before the modified value has been committed. The embodiment also ensures that the second code segment 620 reads the modified value from the instance attribute 640 of the object after the modified value has been committed.

In block 534, the application environment 630 receives a signal 678 indicating that an object in the database is to be deleted. For example, the first code segment comprises the command "orderitem.Delete( );". In response to the signal 678, the application environment 630 de-allocates 680 the memory for the object in the database.

In block536, the application environment 630 provides 682 an invalid address in response to an attempt to access the object. For example, the first code segment may attempt to access the "orderitem" object after it has been deleted. In one embodiment, the application environment returns a NULL address in response to the access request to indicate that the object has been deleted.

Software and Hardware

While the methods and systems herein are described in terms of software executing on various machines, the methods and systems may also be implemented as specifically-configured hardware, such a field-programmable gate array (FPGA) specifically to execute the various methods. For example, referring again to FIG. 1, embodiments can be implemented in digital electronic circuitry, or in computer hardware, firmware, software, or in combination of them. In one embodiment, a computer may comprise a processor or processors. The processor may comprise, or may be in communication with, a computer-readable medium, such as a random access memory (RAM) coupled to the processor. The processor executes computer-executable program instructions stored in memory, such as executing one or more computer programs for editing an image. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example computer-readable media, that may store instructions that, when executed by the processor, can cause the processor to perform the steps described herein as carried out, or assisted, by a processor. Embodiments of computer-readable media may comprise, but are not limited to, an electronic, optical, magnetic, or other storage device capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer system can read. The processor, and the processing, described may be in one or more structures, and may be dispersed through one or more structures. The processor may comprise code for carrying out one or more of the methods (or parts of methods) described herein.

Benchmarking

Systems and methods according to the present invention may provide advantages over existing DBMSs in transaction speed and throughput. For example, one embodiment of the invention was tested using a DBMS benchmarking test suite to compare its performance to conventional DBMSs.

The following tests and results were performed using the open-source PolePosition benchmarking tests available at the polepos.org website. The PolePosition benchmarking tests can be used to test both relational DBMSs and object DBMSs. Benchmark tests that simply reflect the DBMS itself may not be meaningful when it is necessary to test the overall performance of an application using the DBMS. This is at least partly due to the fact that overall performance often includes a cost of transforming data between a relational form and an object form. For relational DBMSs tested, there are results for the relational DBMS itself as well as in combination with a utility for transforming between the relational data and objects. The following compares the relative speeds of an embodiment of the present invention, referred to as Starcounter, against other available DBMSs and language runtimes using 5 different benchmarking tests.

In these benchmark tests one embodiment of the present invention, referred to as Starcounter, is compared with other commercially-available DBMSs. In the benchmarking tests, the following DBMSs were tested:

(1) SolidDB, version 6.0 (in-memory relational DBMS)
(2) MySQL, version 5.0 (disk based relational DBMS)
(3) SolidDB/Hibernate, SolidDB 6.0 in combination with the object-relational mapper Hibernate 2.1
(4) MySQL/Hibernate, MySQL 5.0 in combination with the object-relational mapper Hibernate 2.1
(5) db4o, version 4.5 (disk based object DBMS)
(6) Starcounter (one embodiment of the present invention)

It should be noted that no results regarding the relational DBMSs Oracle, owned by Oracle International Corporation, and SQL Server, owned by Microsoft Corporation, are included in the benchmark tests. Any legal entity that enters into the license agreement distributed with the DBMSs Oracle and SQL Server is prohibited to publish test results of these DBMSs without the written consent of the respective owners. The inventor has not licensed Oracle or SQL Server. Companies other than the inventor have performed benchmark tests of Oracle and SQL Server in relation to MySQL under the terms and conditions of their respective license agreements with Oracle International Corporation and Microsoft Corporation. These tests show that Starcounter outperforms Oracle and SQL Server equally substantially as it outperforms MySQL.

Bahrain Test

The test circuit Bahrain uses flat objects to test writing, reading, updating and querying, especially using indexes. Flat objects are typically as easily translated into rows in a relational database as they are to a class in an object database. The objects used are "Pilot" objects, each having two string attributes "name" and "firstname", and two integer attributes "licenseID" and "points", where the attributes "name" and "licenseID" are indexed.

The "write" lap creates a number of pilots. The "query indexed string" lap queries the DBMS for pilots using the indexed string field "name". It performs a number of queries, each resulting in exactly one object. The "query string lap" does the same thing as "query indexed string", but uses the non-indexed "firstname" as its search criterion. The "query indexed integer" lap does the same thing as the previous query laps, but uses the indexed "licenseID" attribute as its search criterion. The "update" lap updates the indexed "name" attribute to its uppercase equivalent for a number of objects. The "delete" lap deletes all created objects, one by one.

The result of the Bahrain circuit, which was run on 50,000 objects, is presented in Table 1 below. The figures show how many objects per second each technology manage to process in the different laps.

TABLE 1

| Bahrain (objects per second) | write | query indexed string | query string | query indexed integer | query integer | update | delete |
|---|---|---|---|---|---|---|---|
| SolidDB | 18 509 | 3 841 | 44 | 3 019 | 48 | 9 242 | 7 556 |
| MySQL | 6 667 | 5 880 | 46 | 5 928 | 48 | 6 574 | 7 107 |
| SolidDB/Hibernate | 5 557 | 57 | 26 | 57 | 27 | 3 294 | 3 858 |
| MySQL/Hibernate | 4 704 | 57 | 28 | 57 | 30 | 2 764 | 3 020 |
| db4o | 6 846 | 11 433 | 4 | 20 010 | 6 | 3 258 | 5 501 |
| Starcounter | 76 237 | 69 803 | 230 | 69 706 | 260 | 82 760 | 139 221 |

Starcounter and SolidDB are in-memory DBMSs, but whenever data is modified, as in the laps "write", "update"

and "delete", all changes are for security reasons also stored on disk. Still Starcounter is significantly faster than the disk DBMSs in these laps.

To look up an object by some value on a string attribute, as in laps "query indexed string" and "query string", may be a very common operation. It represents for example when a search for a product is performed based on its product name. As can be seen in the table, there is an significant difference in performance between searches on an indexed attribute ("query indexed string") and a non-indexed attribute ("query string"). In some cases, a field used as a search criterion should be indexed. Non-indexed searches tend to be the exception rather than the rule. To look up an object by some value on an integer attribute, as in laps "query indexed integer" and "query integer", tends to also be a very common operation, for example when a search for a product is performed based on its product number.

These results indicate that Starcounter is approximately 1000 times faster than both SolidDB/Hibernate and MySQL/Hibernate for searches on indexed attributes ("query indexed string" and "query indexed integer"). Since these kinds of operations may be very prevalent, it can be very important to have a DBMS performing well on such searches. The object DBMS db4o also performs well and is only 3 to 25 times slower than Starcounter.

Barcelona Test

The Barcelona test tests writing, reading, deleting and indexed searches of objects with a five-level inheritance structure. An example of such a structure in a product hierarchy is: "product"-"groceries"-"beverage"-"soft drink"-"coca cola". object DBMSs tend to be well suited to such structures while relational DBMSs tend not to be. In a relational DBMS an object of the fifth inheritance level is typically retrieved by using a five-table join.

The "write" lap creates a number of objects on the lowest (fifth) level. The "read" lap iterates over all objects and reads one attribute of each object. The "query" lap queries the objects on an indexed integer attribute inherited from the middle (third) level. The "delete" lap deletes all created objects, one by one.

The results of the Barcelona circuit tests, which were run on 50,000 objects, are given in Table 2 below. The figures show how many objects per second each technology processed in the different laps.

TABLE 2

| Barcelona (objects per second) | write | read | query | delete |
|---|---|---|---|---|
| SolidDB | 5 094 | 8 891 | 8 295 | 1 729 |
| MySQL | 1 510 | 3 759 | 3 847 | 1 447 |
| SolidDB/Hibernate | 1 626 | 7 006 | 335 | 1 289 |
| MySQL/Hibernate | 1 405 | 4 115 | 766 | 977 |
| db4o | 28 362 | 93 832 | 19 354 | 16 276 |
| Starcounter | 63 009 | 1 289 062 | 69 567 | 105 025 |

The Barcelona tests are based on an object oriented scenario that tends to favor the object DBMSs db4o and Starcounter. Although db4o performs well, Starcounter is approximately 2 to 14 times faster.

To iterate over all objects of one type, as in lap "read", tends to be a common operation. It represents, for example, when a report is generated based on the sales of different products. On this lap Starcounter is approximately 313 times faster than MySQL/Hibernate, approximately 184 times faster than SolidDB/Hibernate and approximately 14 times faster than db4o.

Starcounter is approximately 208 times faster than SolidDB/Hibernate and approximately 91 times faster than MySQL/Hibernate for searches on indexed attributes ("query") in an inheritance structure.

Imola Test

The Imola circuit tests perform lookups on flat "Pilot" objects using their native identifiers. In an object DBMS, the native identifier is the identifier of the object to retrieve, while in a relational DBMS it is the primary key of the row representing the object.

First a number of objects are created and their identifiers are stored in an array. Then the "retrieve" lap retrieves and reads a field from each object whose identifier is stored in the array.

The results of the Imola test, which were run on 300,000 objects, are provided in Table 3 below. The figures show how many objects per second each technology manage to process.

TABLE 3

| Imola (objects per second) | retrieve |
|---|---|
| SolidDB | 10 882 |
| MySQL | 7 119 |
| SolidDB/Hibernate | 8 592 |
| MySQL/Hibernate | 5 376 |
| db4o | 64 841 |
| Starcounter | 873 371 |

On object retrieval, Starcounter is approximately 162 times faster than the common combination MySQL/Hibernate, more than approximately 102 times faster than SolidDB/Hibernate and approximately 13 times faster than db4o.

Melbourne Test

In the Melbourne circuit, each DBMS may use bulk operations, if possible. Such bulk operations allow one operation to affect many objects. In this test simulation, neither Starcounter nor db4o used bulk operations, leaving them to perform tasks by iterating over objects. In this circuit it is also allowed to use caching mechanisms, if such are provided by the DBMS. The data used are flat "Pilot" objects (as seen in Bahrain and Imola).

The "write" lap creates a number of "Pilot" objects. The "read" lap iterates over all "Pilot" objects, reading their attribute "points". The "read hot" lap does exactly the same thing as lap "read", but it is run directly after a "read" lap, allowing the use of any provided caching mechanisms. The "delete" lap deletes all "Pilot" objects.

Table 4 below shows the results of the Melbourne circuit, which were run on 300,000 objects. The figures show how many objects per second each technology manage to process in the different laps.

TABLE 4

| Melbourne (objects per second) | write | read | read hot | delete |
|---|---|---|---|---|
| SolidDB | 22 528 | 258 309 | 256 435 | 23 812 |
| MySQL | 6 116 | 622 782 | 612 298 | 150 321 |
| SolidDB/Hibernate | 3 794 | 8 236 | 255 263 | 6 584 |

TABLE 4-continued

| Melbourne (objects per second) | write | read | read hot | delete |
|---|---|---|---|---|
| MySQL/Hibernate | 3 535 | 5 277 | 411 322 | 6 769 |
| db4o | 13 336 | 61 559 | 56 685 | 15 340 |
| Starcounter | 51 526 | 1 584 123 | 1 588 980 | 116 018 |

Although this is not an object oriented scenario and Starcounter did not use any bulk operation nor caching mechanism, Starcounter still performs very well. In the "read" lap, Starcounter is approximately 300 times faster than MySQL/Hibernate, approximately 192 times faster than SolidDB/Hibernate and approximately 26 times faster than db4o.

Sepang Test

The Sepang tests operate on a binary object tree, where every node has references to two children. In an object DBMS, references are pointers to child node objects, and in a relational DBMS, it is a foreign key referring to the primary key of the child nodes. The primary keys, used in the relational DBMSs, are indexed. A reference to the tree's root node (object identifier, direct reference, or primary key) is stored in a static context within the executing program.

In the "write" lap, a tree of specified depth is created. Each node is assigned a name to a "name" attribute, has its depth saved in an attribute "depth", and its two child nodes are either set to new nodes, or if the leaf nodes of the tree have been reached, set to a "null" value. The result is a complete binary tree, where both sub trees of any given node have the same depth.

The "read" lap uses the static reference from lap "write" to retrieve the root of the tree, and then traverses it in a depth-first manner. Every node is accessed and its depth attribute is read.

The "read hot" lap does the exact same thing as lap "read", but it is run directly after a "read" lap, allowing the use of any provided caching mechanisms (like lap "read hot" in the Melbourne circuit).

The "delete" uses the same mechanism as laps "read" and "read hot" to traverse the tree, deleting the trees nodes from the bottom up.

Table 5 below shows the results of the Sepang tests, which were run on a binary tree of depth 18 (comprising 262,143 objects). The figures show how many objects per second each technology manage to process in the different laps.

TABLE 5

| Sepang (objects per second) | write | read | read hot | delete |
|---|---|---|---|---|
| SolidDB | 3 656 | 3 664 | 3 660 | 1 851 |
| MySQL | 7 401 | 7 137 | 7 162 | 3 653 |
| SolidDB/Hibernate | 5 058 | 10 560 | 842 014 | 2 370 |
| MySQL/Hibernate | 5 675 | 6 067 | 857 941 | 2 300 |
| db4o | 26 127 | 54 258 | 269 250 | 204 |
| Starcounter | 78 667 | 1 462 812 | 1 462 676 | 83 064 |

The Sepang tests include an object oriented scenario which tends to suit the object DBMSs db4o and Starcounter. The results show that db4o performs well but Starcounter remains approximately 3 to 407 times faster. In the "read" lap, Starcounter is approximately 241 times faster than MySQL/Hibernate, approximately 139 times faster than SolidDB/Hibernate and approximately 27 times faster than db4o.

These test results tend to show that embodiments of the present invention can have significant performance advantages over existing DBMSs.

GENERAL

The foregoing description of some embodiments of the invention has been presented only for the purpose of illustration and description and is not intended to be exhaustive or to limit the invention to the precise forms disclosed. Numerous modifications and adaptations thereof will be apparent to those skilled in the art without departing from the spirit and scope of the invention.

That which is claimed is:

1. A system comprising:
a processor-addressable physical memory; and
a processor in communication with said processor-addressable physical memory and configured to execute an application operating environment and to allocate an operating environment memory to said application operating environment, said operating environment memory corresponding to a physical memory and said application operating environment configured to:
  maintain a database configured to store one or more objects in a database image memory within said operating environment memory, the database image memory process-isolated from applications executed by the application operating environment;
  execute a first application in a first application memory within said operating environment memory, said first application memory process-isolated from said database image memory;
  upon instantiation of a database object by the first application, allocate memory in said database image memory for said database object, said database in said database image memory providing master storage for said database object;
  upon an instruction to obtain said database object by code of said first application, provide to said first application a reference to said database object;
  upon an access operation on an instance attribute or method of said database object by said first application, provide to said first application a processor-addressable memory address in said database image memory and provide direct access by said first application to data of said database object using said processor-addressable memory address;
  provide said processor-addressable memory address to a first code segment in a first transactional scope, said first code segment configured to directly access and update said instance attribute of said database object using said processor-addressable memory address;
  provide said updated instance attribute to said first code segment in said first transactional scope after said update;
  commit said updated instance attribute responsive to said first code segment closing said first transactional scope
  provide an unmodified value of said instance attribute to said second code segment in a second transactional scope in said application operating environment before said commit; and
  provide said updated value of said instance attribute to a third code segment in a third transactional scope in said application operating environment, said third transactional scope initiated after said commit.

2. The system of claim 1, wherein said application operating environment is further configured to:

upon an instantiation of a first non-database object by said first application, allocate memory in said first application memory for said first non-database object; and upon an access operation on an instance attribute of said first non-database object by said first application, provide to said first application direct access to data of said non-database object at a second processor-addressable memory address in said first application memory.

3. The system of claim 1, wherein said application operating environment is further configured to:

upon an instruction to obtain said database object by code of a second application, provide to said second application said reference to said database object, said second application configured to execute in a second application memory within said operating environment memory, said second application memory process-isolated from said first application memory and said database image memory; and upon an access operation on an instance attribute of said database object by said second application, provide to said second application said processor-addressable memory address in said database image memory and provide direct access to data of said database object at said processor-addressable memory address in said database image memory.

4. The system of claim 1, wherein said first code segment and said second code segment execute substantially simultaneously.

5. The system of claim 1, wherein said first application comprises said first code segment and said second application comprises said second code segment.

6. The system of claim 1, wherein said instruction to obtain said database object comprises only native programming language operators.

7. The system of claim 6, wherein said instruction to obtain said database object further comprises a standard structure query language request.

8. The system of claim 1, wherein said application operating environment is further configured to:

delete an object in said database in response to a request from an application, provide an invalid address to subsequent requests for said object, and return an error in response to subsequent attempts to access said object.

9. The system of claim 1, further comprising a non-processor-addressable memory controller in communication with a non-processor-addressable physical memory and said processor-addressable physical memory, and wherein said application operating environment is further configured to:

store a starting operating environment logical memory address and an ending operating environment logical memory address corresponding to one or more of said one or more objects in said database;

transmit a signal to said non-processor-addressable memory controller, said signal configured to cause said non-processor-addressable memory controller to store the values stored from said starting operating environment logical memory address to said ending operating environment logical memory address at sequential non-processor-addressable memory locations in said non-processor-addressable physical memory.

10. The system of claim 9, wherein said non-processor-addressable memory controller is configured to access said processor-addressable physical memory by direct memory access.

11. A non-transitory computer-readable medium comprising processor executable or interpretable instructions in the form of program code, the program code configured to cause a processor to execute a method comprising:

maintaining a database configured to store one or more objects in a database image memory within an operating environment memory;

upon selection of a first application, executing the first application in a first application memory within said operating environment memory, said first application memory process-isolated from said database image memory;

upon instantiation of a database object by a first application, allocating memory in said database image memory for said database object, said database in said database image memory providing master storage for said database object, said first application configured to execute in a first application memory within said operating environment memory, said first application memory process-isolated from said database image memory;

upon an instruction to obtain said database object by code of said first application, providing to said first application a reference to said database object;

upon an access operation on an instance attribute or method of said database object by said first application, providing to said first application a processor-addressable memory address in said database image memory and providing direct access by said first application to data of said database object using said processor-addressable memory address;

providing said processor-addressable memory address to a first code segment in a first transactional scope, said first code segment configured to directly access and update said instance attribute of said database object using said processor-addressable memory address;

providing said updated instance attribute to said first code segment in said first transactional scope after said update;

committing said updated instance attribute responsive to said first code segment closing said first transactional scope providing an unmodified value of said instance attribute to said second code segment in a second transactional scope in said application operating environment before said commit; and providing said updated value of said instance attribute to a third code segment in a third transactional scope in said application operating environment, said third transactional scope initiated after said commit.

12. The non-transitory computer-readable medium of claim 11, further comprising:

upon an instruction to obtain said database object by code of a second application, providing to said second application said reference to said database object, said second application configured to execute in a second application memory within said operating environment memory, said second application memory process-isolated from said first application memory and said database image memory; and upon an access operation on an instance attribute of said database object by said second application, providing to said second application said processor-addressable memory address in said database image memory and provide direct access to data of said database object at said processor-addressable memory address in said database image memory.

13. The non-transitory computer-readable medium of claim 11, wherein said application operating environment is further configured to:
- upon an instantiation of a first non-database object by said first application, allocating memory in said first application memory for said first non-database object; and
- upon an access operation on an instance attribute of said first non-database object by said first application, providing to said first application direct access to data of said non-database object at a second processor-addressable memory address in said first application memory.

14. The non-transitory computer-readable medium of claim 11, wherein said first code segment and said second code segment execute substantially simultaneously.

15. The non-transitory computer-readable medium of claim 11, wherein said first application comprises said first code segment and said second application comprises said second code segment.

16. The non-transitory computer-readable medium of claim 11, wherein said instruction to obtain said database object comprises only native programming language operators.

17. The non-transitory computer-readable medium of claim 16, wherein said instruction to obtain said database object further comprises a standard structure query language request.

18. The non-transitory computer-readable medium of claim 11, further comprising:
- deleting an object in said database in response to a request from an application,
- providing an invalid address to subsequent requests for said object, and
- returning an error in response to subsequent attempts to access said object.

19. The non-transitory computer-readable medium of claim 11, further comprising:
- storing a starting operating environment logical memory address and an ending operating environment logical memory address corresponding to one or more of said one or more objects in said database;
- transmitting a signal to a non-processor-addressable memory controller, said signal configured to cause said non-processor-addressable memory controller to store the values stored from said starting operating environment logical memory address to said ending operating environment logical memory address at sequential non-processor-addressable memory locations in said non-processor-addressable physical memory.

20. The non-transitory computer-readable medium of claim 19, wherein said non-processor-addressable memory controller is configured to access said processor-addressable physical memory by direct memory access.

21. A method comprising:
- maintaining a database configured to store one or more objects in a database image memory within an operating environment memory;
- executing a first application in a first application memory within said operating environment memory, said first application memory process-isolated from said database image memory;
- upon instantiation of a database object by the first application, allocating memory in said database image memory for said database object, said database in said database image memory providing master storage for said database object;
- upon an instruction to obtain said database object by code of said first application, providing to said first application a reference to said database object; and
- upon an access operation on an instance attribute or method of said database object by said first application, providing to said first application a processor-addressable memory address in said database image memory and providing direct access by said first application to data of said database object using said processor-addressable memory address;
- providing said processor-addressable memory address to a first code segment in a first transactional scope, said first code segment configured to directly access and update said instance attribute of said database object using said processor-addressable memory address;
- providing said updated instance attribute to said first code segment in said first transactional scope after said update;
- committing said updated instance attribute responsive to said first code segment closing said first transactional scope
- providing an unmodified value of said instance attribute to said second code segment in a second transactional scope in said application operating environment before said commit; and
- providing said updated value of said instance attribute to a third code segment in a third transactional scope in said application operating environment, said third transactional scope initiated after said commit.

* * * * *